J. W. BARNES.
CHUCK FOR BORING MACHINES, LATHES, OR THE LIKE.
APPLICATION FILED JUNE 26, 1911.

1,112,348.

Patented Sept. 29, 1914.

Witnesses:

Inventor:
John W. Barnes,
by Spear Middleton Donaldson & Spear
Attorneys.

UNITED STATES PATENT OFFICE.

JOHN WILLIAM BARNES, OF ROCK FERRY, ENGLAND.

CHUCK FOR BORING-MACHINES, LATHES, OR THE LIKE.

1,112,348.   Specification of Letters Patent.   Patented Sept. 29, 1914.

Application filed June 26, 1911. Serial No. 635,288.

*To all whom it may concern:*

Be it known that I, JOHN WILLIAM BARNES, a subject of the King of Great Britain, and a resident of Rock Ferry, England, have invented certain new and useful Improvements in Chucks for Boring-Machines, Lathes, or the like, of which the following is a specification.

This invention relates to improvements in chucks or similar appliances adapted for holding drills, boring bits, reamers, and the like in drilling machines, boring machines, electric or pneumatic drills or turret boxes of lathes, and relates to an appliance such that the tool or drill may be readily engaged or disengaged and the connection of the drill or analogous tool with the chuck be of such a character that the tool may float and consequently aline itself with the hole to be drilled or bored.

According to this invention the appliance comprises a socket piece provided with slots fitted with radially movable keys the socket piece being fitted with an outer sleeve slidable thereon and adapted to control the radial position of the keys and their engagement with side recesses formed in a collet piece fitting within the socket and which engages the drill, boring bit, or the like. Further features of this invention consist in making the shank or adapter of the socket piece detachable therefrom by screwing or otherwise and in providing stops for the outer sleeve to limit it in its engaged and disengaged positions.

Figure 1:
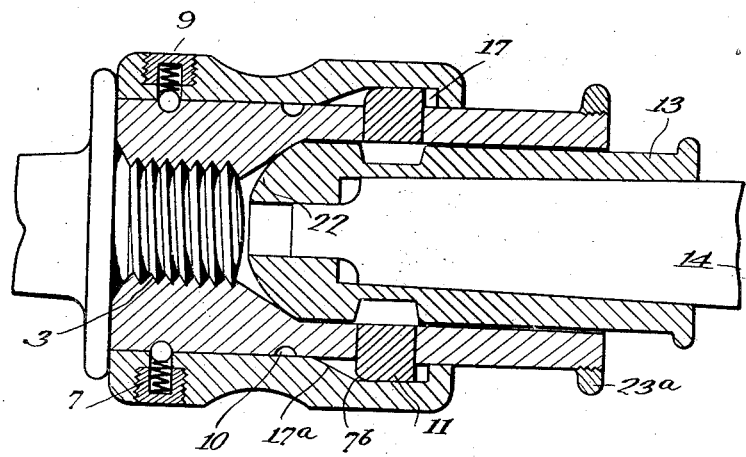
Figure 2:
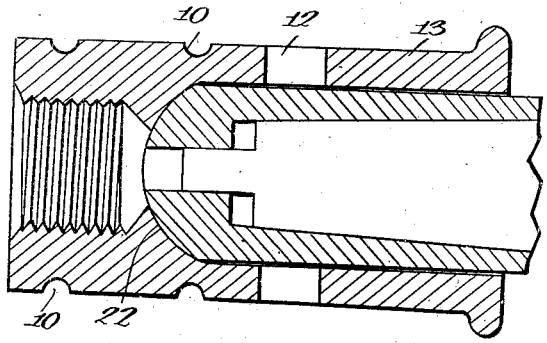

The invention is illustrated in the accompanying drawing in which,

Figure 1 is a longitudinal section through an adjustable chuck constructed in accordance with this invention. Fig. 2 is a view analogous to Fig. 1 in which the base of the collet and socket head are made hemispherically.

In carrying out the invention, the shank or adapter of the socket piece is made detachable therefrom by screwing it into the head of the socket at 3 the adapter being provided with a flange 4, which, when the adapter is screwed into the socket piece, projects beyond the exterior of the latter and thus acts as a stop to the movement of the outer sleeve 5 in one direction, and trues the adapter with the socket when screwed home. Or the spindle portion may be made as part of the socket having flanges screwed at the bottom or top end as may be required. This outer sleeve is provided with an outer annular grooved channel 6 enabling it to be readily handled and moved to the engaging or disengaging position, and one or more spring controlled catches or bolts 7 here shown as balls 8 mounted in a detachable spring casing 9 are fitted in the outer sleeve adapted to normally press against the exterior cylindrical surface of the socket piece, in which are cut two ringed channels 10 which serve to engage and retain the spring catches on the sleeve when the latter is in its upper or lower limiting position, respectively. The spring controlled catches are so designed as to lightly engage with the grooves 10 but may be disengaged when desired by a sharp movement, and thus enable the chuck to be used horizontally or vertically without sleeve slipping out of position. By screwing the adapter shank 1 into the socket piece 2, shanks of varying sizes to suit different conditions may be inserted.

The segmental keys 11 engage the side recesses 12 formed in the collet piece 13 and thus drive the drill 14 or the like which engages with its tang 15 in a slot 16 formed in the head of the collet piece. The segmental keys 11 are retained in engagement by the position of the outer sleeve 5. To release the drill and collet piece from engagement with the socket 2, the sleeve 5 is moved to the position shown in the drawing, the segmental keys then flying out, by centrifugal action, into the recesses 17 in the interior of the sleeve leaving the collet piece 13 free to be withdrawn. When the collet piece and drill have been reinserted, the outer sleeve is slid back again, the inner beveled surface 17$^a$ forcing the keys into engagement with the collet. The edges of the segmental locking keys 11 if left sharp and square are apt to bind against the inner beveled surfaces 17$^a$ of the outer sleeve 5 and to obviate this it is proposed in this invention to round or bevel off the upper corners of the keys as shown at 7$^b$ so that an easier engaging action between the keys and the sleeve may be obtained.

Such an arrangement of adjustable chuck has many advantages inasmuch as it enables the drill to absolutely aline itself and so drill a perfectly true hole. To achieve this it is desirable to make a slight clearance between the collet 13 and the socket 2 thus enabling the drill in the collet to float, relatively to the socket, by an amount equal to the clearance between the collet and the socket, the collet nevertheless being positively driven by the keys 11. The clearance mentioned is not shown, being very slight, but it may be assumed as being the clearance usually allowed for easy entrance of the collet into the socket, allowing for little unevenness caused by rough usage and because of the accumulation of rust, dirt, etc., on the outside of the collet and the inside of the socket. The engaging end of the collet with the head of the socket may be coned at 21 to still further assist the floating and centralizing action of the drill, the end conical formation having the effect of automatically centralizing the rear point of the drill which, in conjunction with the usual clearance around the collet, enables the drill to float and aline itself. In place of coning the end of the collet and head of the socket piece, these engaging parts may be made hemispherical as shown at 22 Fig. 2, or a hemispherical ended collet may be used in a coned socket, as in Fig. 2. The chuck could also with advantage be adapted to turret or capstan lathes for holding the tools in the boxes since it would allow the tools to float and to automatically aline themselves instead of being rigid as at present, and a number of operations such as drilling, countersinking, boring, reaming, and facing, could all be performed with the one tool box of a capstan lathe instead of requiring four such boxes in the ordinary way. Again in electric or pneumatic drilling machines, the constant drifting of the drill spindle tends to bend or distort the spindle, whereas by fitting the spindles with chucks in accordance with this invention, drills may be changed immediately without stopping the machine and without damage to the spindle.

Claim:

In a tool chuck, in combination a socket member having a conical inner end portion, a cylindrical collet engaging the socket, the said collet being of less diameter than the diameter of the socket to provide an annular clearance between the collet and the socket, said collet having an end with a rounded edge adapted to engage the conical end of the socket, said collet having recesses, and said socket having perforations, radially movable keys in the perforations, said keys being adapted to loosely engage the recesses in the collet, a sliding sleeve for controlling the movement of the keys, and a tool shank adapted to be carried in said collet, substantially as described.

In testimony whereof I affix my signature in presence of two witnesses.

JOHN WILLIAM BARNES.

Witnesses:
A. J. DAVIES,
B. E. KNIGHT.